United States Patent [19]

Oguchi et al.

[11] Patent Number: 4,734,359

[45] Date of Patent: Mar. 29, 1988

[54] THERMAL RECORDING MATERIAL FOR DISPLAY AND IMAGE DISPLAY DEVICE UTILIZING THE SAME

[75] Inventors: Yoshihiro Oguchi, Yokohama; Toshikazu Ohnishi, Tokyo; Yoshio Takasu, Tama; Kozo Arahara, Tokyo; Akihiro Mouri, Kokubunji; Katsumi Kurematsu, Kawasaki; Tsutomu Toyono, Yokohama; Shuzo Kaneo, Tokyo, all of Japan

[73] Assignee: Canon Kabushiki Kaisha, Tokyo, Japan

[21] Appl. No.: 925,221

[22] Filed: Oct. 31, 1986

[30] Foreign Application Priority Data

| | | | |
|---|---|---|---|
| Nov. 7, 1985 | [JP] | Japan | 60-249162 |
| Nov. 7, 1985 | [JP] | Japan | 60-249163 |
| Nov. 7, 1985 | [JP] | Japan | 60-249167 |
| Nov. 7, 1985 | [JP] | Japan | 60-249168 |

[51] Int. Cl.[4] .......... G03C 1/68; B32B 3/00; G01D 9/00

[52] U.S. Cl. .......... 430/945; 430/286; 428/195; 428/913; 346/135.1; 503/200; 503/201

[58] Field of Search .......... 428/195, 913; 430/286, 430/945; 346/135.1, 200, 201

[56] References Cited

U.S. PATENT DOCUMENTS

| | | | |
|---|---|---|---|
| 3,912,844 | 10/1975 | Endo et al. | 428/500 |
| 4,028,118 | 6/1977 | Nakasuji et al. | 106/21 |
| 4,103,044 | 7/1978 | Eisenberg et al. | 427/56 |
| 4,318,937 | 3/1982 | Ceintrey | 427/56.1 |

FOREIGN PATENT DOCUMENTS

| | | |
|---|---|---|
| 0082088 | 5/1982 | Japan . |
| 0082087 | 5/1982 | Japan . |

OTHER PUBLICATIONS

Bank et al, Thermally Induced Phase Separation of Polystyrene-Poly (vinyl methyl ether) Mixtures, 1972, vol. 10, pp. 1097-1109 (1972).

McMaster, Aspects of Polymer-Polymer Thermodynamics, 1973, vol. 6, No. 5, pp. 760-773, Sep.—Oct., 1973.

McMaster, Aspects of Liquid—Liquid Phase Transition Phenomena In Multicomponent Polymeric Systems, 1974, pp. 254-259.

Leffingwell et al, Thermally Induced Phase Separation of Chlorinated Rubber/Poly(Ethylene—Co—Vinyl Acetate) Mixtures, 1973, pp. 596-604, 1973.

Paul et al, Polymer Blends Containing Poly(Vinylidene Fluoride), Part IV: Thermodynamic Interpretations, 1978, vol. 18, No. 16, pp. 1225-1234, 12/78.

*Primary Examiner*—John E. Kittle
*Assistant Examiner*—Patrick J. Ryan
*Attorney, Agent, or Firm*—Fitzpatrick, Cella, Harper & Scinto

[57] ABSTRACT

Thermal recording material has a plate- or film-formed polymer blend layer which is in a mutually dissolved transparent state below a certain temperature and in a phase-separated opaque state above said temperature. This thermal recording material is employed in an image display device, which is provided, in succession, with a recording heater movable along the recording material, an image display unit, a uniform heater and a gradual cooler for image erasure.

10 Claims, 9 Drawing Figures

THERMAL RECORDING MATERIAL FOR DISPLAY AND IMAGE DISPLAY DEVICE UTILIZING THE SAME

BACKGROUND OF THE INVENTION

1. Field of the Invention

The present invention relates to a display material capable of thermal recording and erasure of information such as characters, and a display device utilizing said material.

2. Related Background Art

There are already known reversibly erasable and repeatedly usable information recording materials such as photochromic materials, thermochromic materials, magnetic recording materials etc.

A known display device utilizing thermochromic material employs a display medium of a sandwich structure, composed of a reversible thermochromic material $Ag_2HgI_4$ sandwiched between a pair of polyester films. Said display medium is formed as an endless belt positioned over two rollers, and the information is recorded line by line with a thermal head while said medium is displaced. Said material is yellow at normal temperature but becomes yellow-orange at a temperature above 50° C. The color change shows a hysteresis to temperature change, and the material returns to the original color upon cooling. Consequently, in order to retain the recorded information, the display area between the two rollers is maintained at a constant temperature with a panel heater. The recorded information is erased by moving the recording medium away from the display area and by cooling with suitable cooling means. Since such material lacks memory property, the heater has to be turned on continuously. Consequently, the display device is inevitably large and complex, and requires a large electric power consumption. Also the use of a filter may be necessary since the displayed color is not very clear.

SUMMARY OF THE INVENTION

An object of the present invention is to provide a thermal recording material for display and a display device utilizing said material, employing a thermal recording method not associated with the above-mentioned drawbacks.

Another object of the present invention is to provide a thermal recording material for display which is repeatedly usable and has a satisfactory memory property and a display device utilizing said material.

The foregoing objects can be achieved according to the present invention by a thermal recording material for display, which is provided with a substrate and a polymer blend layer formed thereon and capable of changing from a transparent state to an opaque state and retaining said opaque state when heated to a certain temperature and returning to said transparent state when cooled below said temperature.

The image display device of the present invention utilizing the above-mentioned thermal recording material is provided, in succession, with thermal recording means for recording image information along the moving direction of said recording material, an image display unit, and uniform heating and gradual cooling means for erasing the information recorded as opacity on said recording material.

DETAILED DESCRIPTION OF THE PREFERRED EMBODIMENTS

Figure 1:
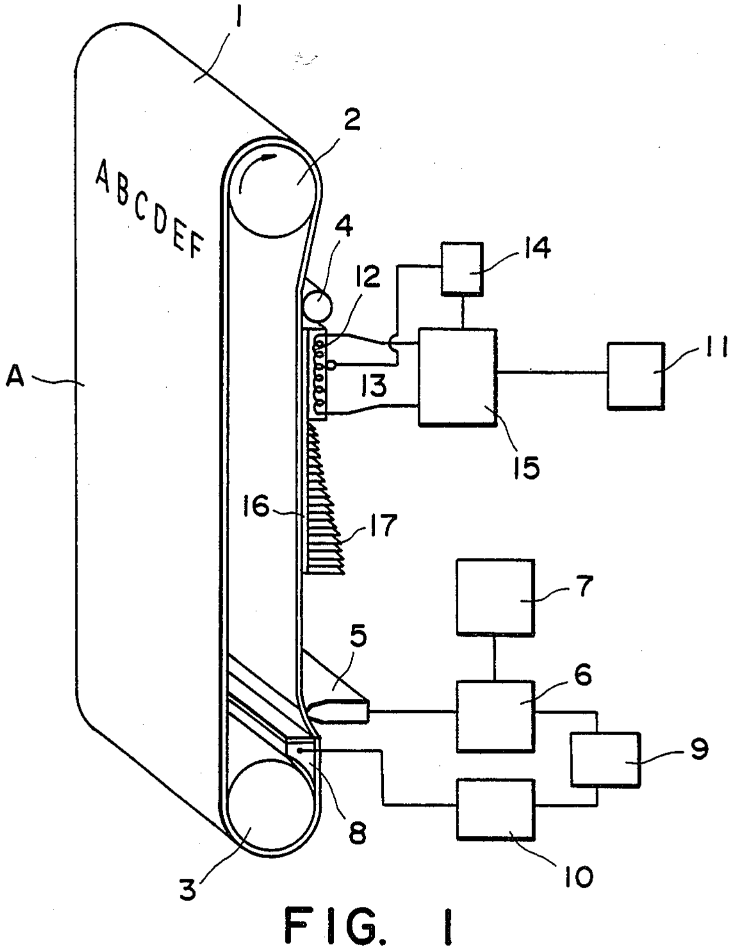
FIG. 1 is a schematic view of a display device embodying the present invention.

The high molecular recording layer employed in the recording belt of the present invention is composed of a polymer blend layer of at least two stable polymers which are in a mutually dissolved uniform state below a certain temperature but in a phase-separated state above said temperature. If the polymers have different refractive indexes, the layer is transparent in the mutually dissolved state but becomes opaque due to light scattering in the phase-separated state of higher temperature. Such polymer blend showing an LCST (Lower Critical Solution Temperature) phase diagram is already known for a certain number of polymer combinations. Examples of such polymer combinations are a combination of a vinylidene fluoride-hexafluoroacetone copolymer and a methacrylate ester polymer; a combination of a vinylidene copolymer and an acrylate ester polymer; a combination of polyvinylidene fluoride and polymethyl acrylate, polyethyl acrylate, polymethyl methacrylate or polyethyl methacrylate; a combination of polycaprolactone and polycarbonate [R. E. Bernstein et al., Macromolecules, 10, P. 681 (1977)]; a combination of polystyrene and polyvinylmethylether [M. Bank et al., J. Polym. Sci., A-2 10, p. 1097 (1972)]; a combination of a styrene-acrylonitrile copolymer and polycaprolactone [L. P. McMaster, Macromolecules, 6, p. 760 (1973)]; a combination of a styrene-acrylonitrile copolymer and polymethyl methacrylate [L. P. McMaster, Polym. Prepr. 15, p. 254 (1974)]; a combination of polyvinyl nitrate and polymethyl acrylate [Saburo Akiyama et al., Kobunshi Ronbunshu, 33, p. 238 (1976)]; a combination of polyvinylidene fluoride and polyvinylmethylketone [D. R. Paul et al., Polym Eng. Sci., 18, p. 1225 (1978)]; and a combination of an ethylene-vinyl acetate copolymer and chlorinated rubber [J. Leffingwell et al., Polym. Prepr., 14, p. 596 (1973)]. These polymer combinations cause phase separation when heated to 100°-200° C. according to the blending ratio, and become more opaque by light scattering in different degrees, in comparison with an unheated area.

Said high molecular recording material can fix the phase-separated state when rapidly cooled from the heated state, and can return from this fixed phase-separated state to the original mutually dissolved state when heaated to a temperature above said phase-separating temperature followed by gradual cooling. Consequently the recording device of the present invention effects information recording by a signal to bring said high molecular recording material to a temperature causing said phase separation, followed by rapid cooling. Also the recorded image can be erased by heating of the entire or recorded area followed by gradual cooling.

As will be apparent from the foregoing explanation, the high molecular recording material employed in the display device of the present invention can significantly extend the number of cycles of recording and erasure since it relies on a combination of stable polymers and does not involve a material change as in the case of conventional thermochromic materials or a conventional system of a low molecular substance in a polymer matrix. Also, a display device can be easily constructed through a heating above the phase separating temperature and controlling the cooling time, without delicate temperature control.

FIG. 1 illustrates an image display device embodying the present invention, wherein a recording belt 1, having the aforementioned high molecular recording material on a substrate such as a polyester film, is formed as an endless belt and maintained, between a driving roller 2 and an idler roller 3, at a constant tension with a pressure roller 4. Said recording belt 1 is driven in a direction indicated by an arrow, by means of the driving roller 2. A thermal head 5 for information recording is energized by a recording head driving circuit 6. In response to an image signal supplied by means 7 from a computer, an image reader or a floppy disk, the thermal head 5 heats the recording belt 1 to a temperature inducing the phase separation, whereby the heated area changes from the transparent state to the opaque state. The heated recording belt 1 is rapidly cooled, for fixing the recorded information, by electronic cooling means 8 utilizing a Peltier element and positioned in the vicinity of the thermal head 5 in the moving direction of the belt 1. Recording control means 9 controls the information recording by releasing a recording start signal, in response to which the driving roller 2 is activated to displae the recording belt 1, and the recording is simultaneously initiated by the driving circuit 6. Also at the same time a cooling control circuit is activated to energize the rapid cooling means 8, thereby obtaining a visible information recording. After the completion of recording with the thermal head, the driving roller 2 is stopped when the end of the recorded image reaches a front display area A.

In this state the recording belt 1 is stopped, and the recording head is eventually released from the contact with the belt 1. If erasure of information is requested after the display, a switch is actuated to activate an erasure circuit 11, thereby energizing an erasing heater 12 and activating the driving roller 2 to displace the belt 1. Said heater 12 is composed of a panel heater, of which temperature is detected by a thermister 13 and a temperature detecting circuit 14, and the recording belt 1 is thus heated above the phase separating temperature by heater control means 15.

Said heater 12 is mounted on a heat diffusing metal plate 16, which is extended from the heating area toward the downstream side in the moving direction of the belt 1, and fixed to a heat radiating fin 17 gradually expanded toward the downstream direction to constitute gradual cooling means for the recording belt. After a belt position to be erased passes through said gradual cooling means, the power supply to the heater 12 is terminated, and the driving of the recording belt 1 is then stopped.

After the belt is stopped, the heater 12 and the diffuser plate 16 are preferably released from the contact with the recording belt 1, in order to prevent thermal fatigue or deformation thereof. It is naturally possible, simultaneously with the erasure of information in the above-explained manner, to record new information with the recording head 5 and the rapid cooling means 8.

The above-mentioned rapid cooling means 8 is effective in case of a high speed recording, but may be dispensed with if a spontaneous cooling is enough after the heating with the thermal head 5.

Figure 2:
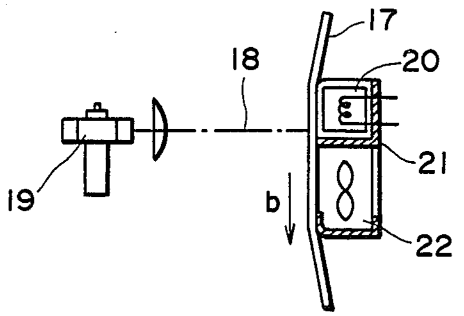
FIG. 2 is a partial cross-sectional view showing a variation in the recording unit.

FIG. 2 shows another embodiment of the recording means, wherein a recording belt 17 moves in a direction b. Said belt 17 is scanned by a laser beam deflected by a rotating polygon mirror 19, whereby the recording belt 17 shows opacity by phase separation corresponding to the image information. Opposed to a position of the recording belt 17 irradiated by the laser beam, there is provided a preheating heater 20 controlled to a temperature below the phase separating temperature. The opaque image on the belt 17 is fixed by rapid cooling with air cooling means 22, consisting of a fan positioned close to the irradiating position but separated therefrom with a heat insulator 21. Also in this case the heater 20 is preferably released from the recording sheet 17 after the recording operation, in order to prevent thermal deformation thereof. In case the recording pixel corresponding to the laser beam diameter is small or in case the recording material has a high phase separating temperature, the rapid cooling can be achieved with a metal plate with a radiating fin or without any cooling means.

The heat diffusing plate constituting the above-mentioned gradual cooling means has a form matching the cooling temperature characteristic for erasing the image in the high molecular recording layer of the recording belt. The heating elements in the recording or erasing unit may be provided with a combination of an eccentric cam and a rotary plunger or a combination of a spring and a solenoid, so as to be maintained in contact with the belt only when required against the biasing force for example of said spring and separated from the belt otherwise. The energization of said solenoid can be controlled for example by the belt driving signal.

The above-explained display device is capable of stable recording and retaining of image information and repeated recording operations, and is free from smear in the device, since it no longer employs toner powder required in the conventional electrostatic display device.

Figure 3:
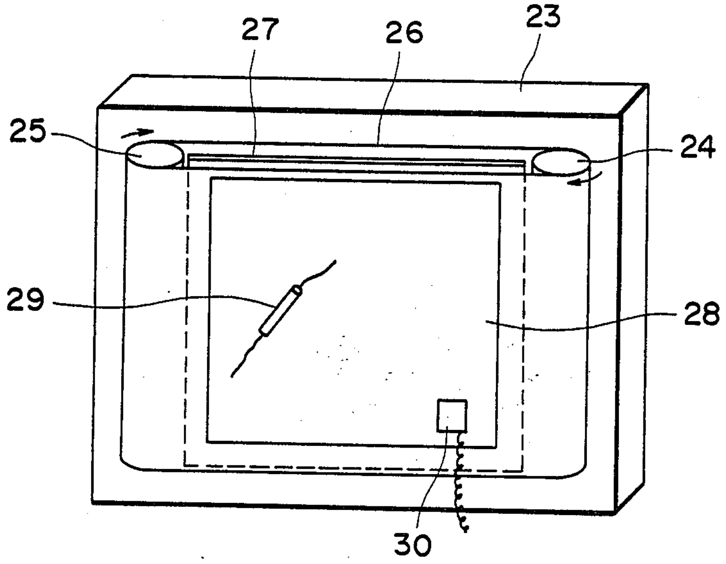
FIG. 3 is a perspective view of a display device embodying the present invention.
Figure 4:
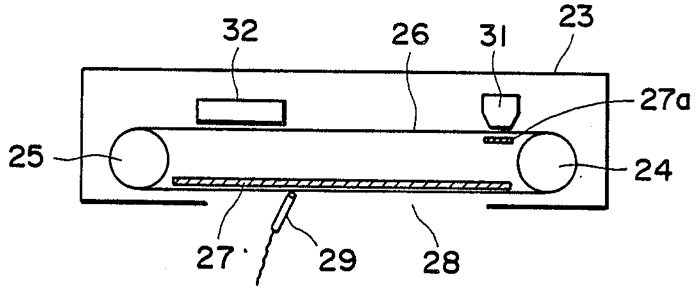
FIG. 4 is a horizontal cross-sectional view thereof.

No reference is made to FIGS. 3 and 4 for explaining another embodiment provided with a black heat-absorbing member, for improving the visibility of the recorded information and also improving the thermal efficiency at information recording.

FIGS. 3 and 4 are respectively a perspective view and a plan view of said embodiment, wherein a recording belt 26, provided in a housing 23, is formed as an endless belt supported between a driving roller 24 and an idler roller 25 and is intermittently driven. Arrows indicate the driving directions of said rollers.

The recording belt 26 is composed of a substrate such as a polyethylene terephthalate film, and a high molecular recording layer formed thereon and consisting of a thin polymer blend layer of at least two stable polymers, which are in a mutually dissolved uniform state below a certain temperature but are in a phase-separated state above said temperature. If said polymers have different refractive indexes, the layer shows uniform transparency in the mutually dissolved state but becomes opaque due to light scattering in the phase-separated state at a higher temperature.

The recording onto said recording belt 26 can be achieved, in the same manner as in the case of FIG. 1, with any heating means. As an example, a heating pin 29, provided with a pen-shaped front end and a heater, is maintained in contact with the belt 26 to directly record an image thereon. Said pen 29 is so constructed as to be automatically turned off when it is separated from the belt 26. Also direct recording is possible with a pen utilizing heat generation with light. Furthermore, image formation in a dot pattern is possible with a thermal head 31 or a laser, in response to an external signal from a computer or a word processor. Such thermal head may be fixed or may be moved with respect to the belt 26.

Combination of the above-mentioned various recording methods allows to add information with a thermal pen to a record obtained with a thermal head corresponding to an external signal.

In order to improve the efficiency of change to opaque state of the recording belt by the above-mentioned heating means, there are provided black heat-absorbing members 27, 27*a* are provided in positions opposed to said heating means and in contact with the recording belt 26. Said member 27 is composed for example by coating, on a metal plate, a black pigment such as carbon black or titanium black dispersed in polyethylene terephthalate. Said member is preferably provided with a large thermal capacity, and is an important constituent in the present invention for increasing the image contrast thereby improving the visibility of the displayed image, in addition to the aforementioned characteristics.

The image formed on the recording belt 26 can be erased, when required, by an eraser 30 and an erasing unit 32. The image erasure is achieved by heating the recording belt with a heater or a light and regulating the cooling speed thereafter, for example with a metal plate of a gradually descending temperature slope. In this manner it is rendered possible to provide a display device capable of recording and displaying a clearly visible image, adding information on the display area and erasing the information entirely or partially.

The foregoing embodiment employs a fixed heat-absorbing black member, but the heat-absorbing property is effective only when information recording is required on the display area and a dark surface other than black can serve for improving the visibility only. Also the heat-absorbing member 27 and the belt 26 are maintained in mutual contact, but, if they are not contacted, the belt 26 is cooled rapidly at the recording to achieve the opaque state more easily. The belt 26 is not necessarily formed as an endless belt but can be formed as a sheet.

In the foregoing embodiment, the use of a black face opposed to the recording belt improves the contrast of the image, fully utilizing the opacity of the recording belt, though such black face is not indispensable.

Figure 5:
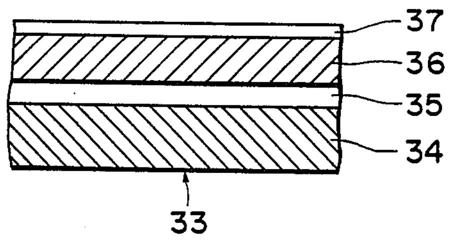
FIG. 5 is an enlarged partial cross-sectional view of a recording sheet of the present invention.

FIG. 5 is a cross sectional view of still another embodiment in which the effect of the embodiment shown in FIG. 3 is achieved by the recording sheet itself. In FIG. 5, a black heat-absorbing substrate 34 plays an important in the present invention, and can be composed, for example, polyethylene terephthalate in which carbon black or titanium black is dispersed. A high molecular recording material provided thereon is composed of a polymer blend layer which causes phase separation upon heating, thereby changing from a transparent state to an opaque state. The property of said phase-separable polymer blend layer 35 allows the recording of an image on the belt 33 with heating means such as a thermal head or a heat pen, and the erasing of the image. The belt 33 may be eventually provided with a protective layer 36 for protecting the polymer blend layer 35, and an anti-reflective layer 37 for preventing light reflection.

Figure 6:
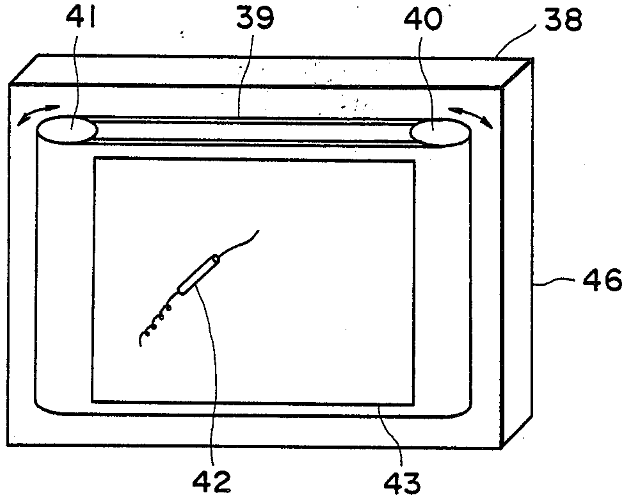
FIG. 6 is a perspective view of a display device employing said recording sheet.
Figure 7:
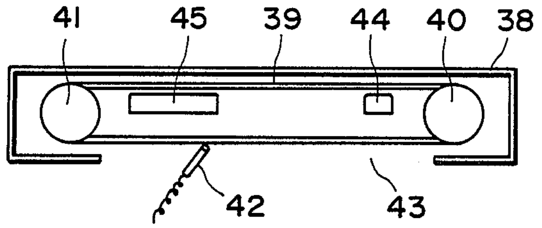
FIG. 7 is a cross-sectional view thereof.

FIGS. 6 and 7 are schematic views of a display device 46 utilizing said sheet. The device 46 is provided with a recording belt 39 in a casing 38, said belt being formed as an endless belt, supported between a driving roller 40 and an idler roller 41 and intermittently driven. Said rollers can be driven in either direction, which is suitably selected according to the condition of image recording or erasing.

Said recording belt 39 is transparent (transmission higher than 90%) at normal temperature but becomes opaque (transmission lower than 10%) upon heating followed by rapid cooling. The recording on the recording belt 39 may be achieved any heating means. A direct recording on said belt 39 is possible for example with a heat pen 42 provided with a pen-shaped front end and a heater and maintained in contact with said belt. Said pen is so constructed as to be automatically turned off when it is separated from the recording belt 39. Also a direct recording on the display area is possible with a pen-shaped recording means utilizing heat generation with a light source. Also image information in a dot pattern is possible with a thermal head 44 or a laser in response to an external signal for example from a computer or a word processor. Such thermal head or the like may be fixed or movable with respect to the belt 39.

Combination of the above-mentioned recording methods allows to add information for example with a heat pen, to an image recorded with a thermal head in response to the external signal.

The heating means can form a record from the front surface or the rear surface of the recording belt 38. A recording from the side of the polymer blend layer 35 of the belt 39 shows a higher thermal efficiency in comparison with a belt in which the substrate 34 is composed of a transparent sheet, since the applied heat works directly on the polymer blend layer and further serves to heat the black heat-absorbing substrate 34. In case the heat source is a light source, the use of the black heat-absorbing substrate improves the photo-thermal conversion efficiency. However, it is also possible to form a record on said belt, by heating from the rear side of said belt 39, i.e. from the side of the black heat-absorbing substrate, with the heating means.

In case the anti-reflective layer 36 of the belt 39 is replaced by a Teflon coating which is characterized by a low surface tension, it is also possible to write on the display face with a conventional peelable white pen and to erase such writing by rubbing. Such peelable white pen can be composed of a white pigment such as titanium oxide, combined with a solvent such as an alcohol, a cellosolve, a glycerine, a glycol or an ester and with spindle oil for facilitating the erasure by rubbing.

In the display material of the present invention, the opaque layer is not limited to black coloring but can be any dark color that enhances the visibility of the opaque portion of the high molecular recording material. Thus "opaque" does not mean absence of transmission to light but the presence of certain color. Said display material need not be formed as an endless belt but can be formed also as a cut sheet or a plate.

As explained in the foregoing, the use of an opaque substrate improves the heat efficiency in forming phase separation at the information recording and improves the visibility of the recorded image at the display.

Figure 8:
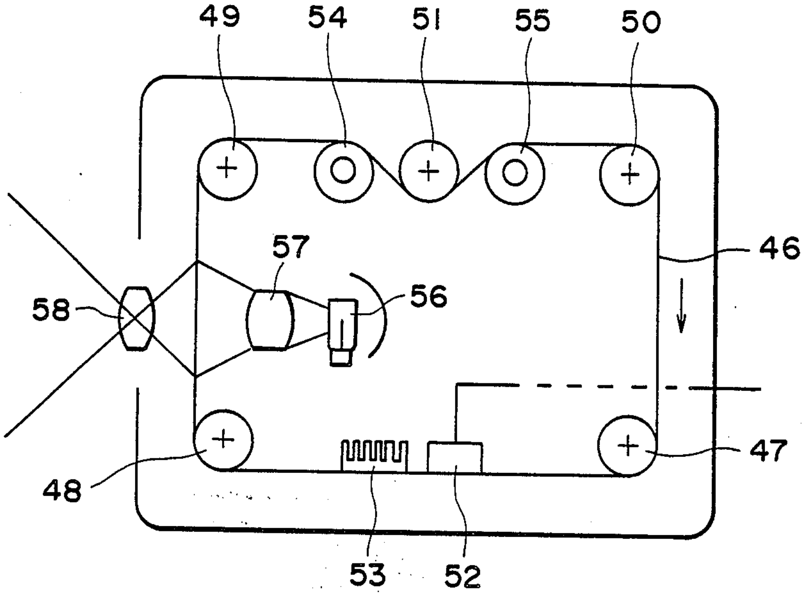
FIG. 8 is a cross-sectional view of another embodiment of the present invention.

FIG. 8 shows still another embodiment in which the foregoing thermal recording material can be utilized not only for the direct observation of the information recorded thereon but also for projection of such information.

FIG. 8 is a schematic view of said embodiment, wherein a transparent recording belt 46, formed as an endless belt and provided internally with the aforementioned high molecular recording material, is supported by a driving roller 47, support rollers 48, 49, 50 and a tension roller 51 and is driven in a direction of arrow by an unrepresented motor linked to the roller 47. Along the recording layer of said belt 46, there are provided a recording-heating unit 52, a cooling unit 53, erasing-heating rollers 54, 55.

The information recording on the recording belt is achieved by a thermal pattern applied by the recording-heating unit 52 according to a signal given from an unrepresented interface, and the resulting visible image is fixed by rapid cooling in the cooling unit 53. As already explained, the cooling unit 53 is an essential component in the device utilizing the polymer blend layer of the present invention. The position of the cooling unit is preferably rendered movable since the time for cooling is variable according to the heating temperature and the employed combination of polymers. Said cooling unit can be composed for example of an aluminum block radiator provided with radiating fins, or a heat pipe equipped with an external cooling device. The heating signal can be supplied for example a conventional thermal head or a converged laser beam.

The information thus recorded can be utilized for various purposes, for example conversion into an electric signal after projection. FIG. 8 shows an example of arrangement equipped with a projection lamp 56, a condenser lens 57 and a projection lens 58, but the arrangement is not limited to such case.

The recorded information which has become no longer necessary can be erased by the heating roller 54 eventually combined with the gradually cooling roller 55, and the belt 46 is recycled for repeated information recording.

Figure 9:
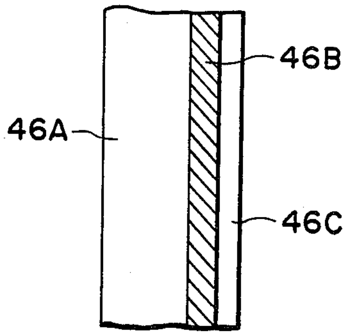
FIG. 9 is an enlarged cross-sectional view of a recording belt employed in the apparatus shown in FIG. 8.

FIG. 9 is an enlarged cross-sectional view of the recording belt employed in the apparatus shown in FIG. 8, wherein said recording belt is composed of a transparent heat-resistant substrate 46A such as a polyester film, a polymer blend layer 46B coated thereon and composed of at least two polymers capable of phase separation upon heating, and an eventual protective layer 46C.

The device of the present embodiment is characterized by the use of an endless recording belt and the effective arrangement of recording, cooling, reproducing and erasing means inside said belt. Such arrangement allows to obtain an extremely compact device in consideration of the relative complexity of the employed process and to achieve accurate reading, projection and observation of the recorded information, since the recording layer is positioned inside the endless belt and is protected from dusts and scars.

What is claimed is:

1. An image display device comprising:

a thermal recording material composed of a heat-resistance flexible sheet substrate and a polymer blend layer which is provided on said substrate and which changes from a transparent state to an opaque state and retains said opaque state when heated to a certain temperature followed by rapid cooling but returns from said opaque state to the transparent state when heated again above said temperature and then gradually cooled;

means for movably supporting said recording material; and thermal recording means for heating said recording material according to image information; a display unit for displaying opaque record on said recording material; and image erasing means by uniformly heating and then gradually cooling the recording material, in succession, along the moving direction of said recording material.

2. An image display device according to claim 1, wherein said thermal recording material is of a seamless belt to be driven in the apparatus effecting endless movement.

3. An image display device according to claim 2, wherein the thermal recording means and the image erasing means are positioned opposed to the recording material which positioned opposite to the display unit.

4. An image display device according to claim 2, wherein said thermal recording means and image erasing means are positioned inside the endless moving recording material.

5. An image display device comprising: a thermal recording material composed of a heat-resistant flexible sheet substrate and a polymer blend layer which is provided on said substrate and which changes from a transparent state to an opaque state and retains said opaque state when heated to a certain temperature followed by rapid cooling but returns from said opaque state to the transparent state when heated above said temperature and then gradually cooled, wherein the substrate of said thermal recording material is composed of a transparent material, and a member having a property of absorbing heat is provided opposite to the display side of the display unit;

means for movably supporting said recording material;

thermal recording means for heating said recording material according to image information;

a display unit for displaying an opaque record on said recording material; and image erasing means for uniformly heating and then gradually cooling the recording material, in succession, along the moving direction of said recording medium.

6. An image display device according to claim 5, wherein said heat-absorbing member is of black color.

7. An image display device comprising: a thermal recording material composed of a heat-resistant flexible sheet substrate and a polymer blend layer which is provided on said substrate and which changes from a transparent state to an opaque state and retains said opaque state when heated to a certain temperature followed by rapid cooling but returns from said opaque state to the transparent state when heated above said temperature and then gradually cooled wherein the substrate of said recording material is of a dark color including black color;

means for movably supporting said recording material; and thermal recording means for heating said recording material according to image information;

a display unit for displaying an opaque record on said recording material; and image erasing means by uniformly heating and then gradually cooling the recording material, in succession, along the moving direction of said recording medium.

8. An image display device according to claim 1, wherein said recording material is provided with an anti-reflective layer on a surface thereof at the display side.

9. An image display device according to claim 1, also including a second thermal recording means.

10. An image display device according to claim 1, wherein the polymer blend layer of said recording material is selected from a group consisting of a combination of vinylidene fluoride-hexafluoroacetone copolymer and a methacrylate ester polymer; a combination of a vinylidene fluoride copolymer and an acrylate ester polymer; a combination of polyvinyl fluoride and polymethyl acrylate, polyethyl acrylate, polymethyl methacrylate or polyethyl methacrylate; a combination of polycaprolactone and polycarbonate; a combination of polystyrene and polyvinylmethylether; a combination of a styrene-acrylonitrile copolymer and polycaprolactone; a combination of a styrene-acrylonitrile copolymer and polymethyl methacrylate; a combination of polyvinyl nitrate and polymethyl acrylate; a combination of polyvinylidene fluoride and polyvinylmethylketone; and a combination of an ethylene-vinyl acetate copolymer and chlorinated rubber.

* * * * *

UNITED STATES PATENT AND TRADEMARK OFFICE
CERTIFICATE OF CORRECTION

PATENT NO. : 4,734,359 Page 1 of 3

DATED : March 29, 1988

INVENTOR(S) : OGUCHI, ET AL.

It is certified that error appears in the above-identified patent and that said Letters Patent is hereby corrected as shown below: Title page:

IN THE LISTING OF INVENTORS

"Shuzo Kaneo", should read --Shuzo Kaneko,--

COLUMN 2

Line 43, "P. 681 should read --p.681--.

COLUMN 2

Line 66, "heaated" should read --heated--.

COLUMN 3

Line 41, "displae" should read --displace--.

UNITED STATES PATENT AND TRADEMARK OFFICE

CERTIFICATE OF CORRECTION

PATENT NO. : 4,734,359

DATED : March 29, 1988

INVENTOR(S) : OGUCHI, ET AL.

It is certified that error appears in the above-identified patent and that said Letters Patent is hereby corrected as shown below:

COLUMN 3

Line 57, "thermister 13" should read --thermistor 13--.

COLUMN 5

Line 28, "are provided" should be deleted.

COLUMN 5

Line 64, "cross sectional" should read --cross-sectional--.

COLUMN 6

Line 1, "polyethylene" should read --of polyethylene--.

COLUMN 6

Line 44, "The" should read --These--.

COLUMN 7

Line 3, "to" should read --of--.

COLUMN 7

Line 59, delete "an eventual".

UNITED STATES PATENT AND TRADEMARK OFFICE

CERTIFICATE OF CORRECTION

PATENT NO. : 4,734,359

DATED : March 29, 1988

INVENTOR(S) : OGUCHI, ET AL.

It is certified that error appears in the above-identified patent and that said Letters Patent is hereby corrected as shown below:

COLUMN 8

Line 30, "which positioned" should read --which is positioned--.

COLUMN 8

Line 68, "cooled" should read --cooled,--.

Signed and Sealed this

Twenty-first Day of February, 1989

Attest:

DONALD J. QUIGG

Attesting Officer

Commissioner of Patents and Trademarks